United States Patent
Russell

(10) Patent No.: US 7,895,314 B1
(45) Date of Patent: Feb. 22, 2011

(54) SYSTEM AND METHOD FOR ADMINISTERING A DEVICE VIA INSTANT MESSAGING

(75) Inventor: Georgina Russell, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1470 days.

(21) Appl. No.: 10/741,456

(22) Filed: Dec. 19, 2003

(51) Int. Cl.
*G06F 15/16* (2006.01)
*G06F 15/173* (2006.01)

(52) U.S. Cl. ............... 709/224; 709/207; 709/223

(58) Field of Classification Search ............... 709/219, 709/229, 231, 207, 223, 224; 719/231, 313, 719/329
See application file for complete search history.

(56) References Cited

U.S. PATENT DOCUMENTS

| | | | | |
|---|---|---|---|---|
| 4,237,344 A * | 12/1980 | Moore | ............... | 379/38 |
| 5,062,147 A * | 10/1991 | Pickett et al. | ............... | 714/46 |
| 5,630,207 A * | 5/1997 | Gitlin et al. | ............... | 340/7.23 |
| 5,886,647 A * | 3/1999 | Badger et al. | ............... | 340/825.69 |
| 6,667,688 B1 * | 12/2003 | Menard et al. | ............... | 340/531 |
| 7,224,774 B1 * | 5/2007 | Brown et al. | ............... | 379/88.14 |
| 7,356,565 B2 * | 4/2008 | Zimmermann et al. | ............... | 709/206 |
| 2002/0042830 A1 * | 4/2002 | Bose et al. | ............... | 709/230 |
| 2002/0177428 A1 * | 11/2002 | Menard et al. | ............... | 455/404 |
| 2003/0078979 A1 * | 4/2003 | Sagi | ............... | 709/206 |
| 2003/0079024 A1 | 4/2003 | Hough et al. | ............... | 709/227 |
| 2003/0117280 A1 * | 6/2003 | Prehn | ............... | 340/540 |
| 2003/0177184 A1 | 9/2003 | Dickerman et al. | ............... | 709/204 |
| 2003/0208545 A1 | 11/2003 | Eaton et al. | ............... | 709/206 |
| 2004/0103153 A1 * | 5/2004 | Chang et al. | ............... | 709/206 |
| 2004/0260820 A1 * | 12/2004 | Bearman | ............... | 709/229 |
| 2005/0091301 A1 * | 4/2005 | Oreizy et al. | ............... | 709/200 |
| 2005/0102362 A1 * | 5/2005 | Price et al. | ............... | 709/206 |
| 2005/0141687 A1 * | 6/2005 | Ozugur et al. | ............... | 379/201.02 |

OTHER PUBLICATIONS

Tillett, Scott, *Could You Chat With a Database?*, InternetWeek, Mar. 19, 2001, pp. 1-2, URL: http://www.techweb.com/wire/story/TWB20010319S0009 (printed on Dec. 19, 2003).

Saunders, Christopher, *IMPlanet Roundup: The Views*, Oct. 22, 2003, pp. 1-5, URL: http://www.instantmessagingplanet.com/enterprise/article.php/3097461 (printed on Dec. 19, 2003).

Business Wire, *MontaVista Software and Movial Connect to Provide Instance Messaging for Linux-Based Consumer Devices*, EEdesign, Jan. 29, 2003, pp. 1-3, URL: http://www.eedesign.com/story/36777 (printed on Dec. 19, 2003).

\* cited by examiner

*Primary Examiner*—Aaron Strange
(74) *Attorney, Agent, or Firm*—Campbell Stephenson LLP

(57) ABSTRACT

Instant messages are sent to and from a device. For example, one embodiment of a method involves detecting an instant message on a port associated with a device and performing an action corresponding to an administrative command, where the instant message includes information indicative of the administrative command. Another embodiment of a method involves detecting a trigger condition during operation of a device and sending an instant message to an administrator, where the instant message includes information indicative of the trigger condition.

6 Claims, 8 Drawing Sheets

SYSTEM AND METHOD FOR ADMINISTERING A DEVICE VIA INSTANT MESSAGING

FIELD OF THE INVENTION

This invention relates to instant messaging and, more particularly, to administering a device via instant messaging.

BACKGROUND

Administrators of today's computing environments control the operation of various servers. In order to ensure that these servers provide desired services to users, administrators are often required to be "on call" at night and on weekends. In order to provide administrators with greater flexibility, servers have been adapted for use with services that allow administrators to administer servers remotely. For example, administrators can use a service such as telnet to log into a server remotely.

One problem that arises when administering servers remotely is that, if multiple servers are being administered, each server may have a different remote interface. Each interface may be accessible via a different protocol. Accordingly, in order to be able to administer each of the different servers, an administrator may be forced to install a client for each different protocol on each device that the administrator wants to use for remote administration. For example, an administrator may need to install a proprietary client in order to be able to remotely administer a file server. The same administrator may use a web client in order to be able to remotely administer a database server. If the administrator works with several different servers, the administrator may be forced to frequently switch between interfaces in order to monitor and communicate with each different server. It is desirable to use a single client to remotely administer different servers.

Another problem that arises when administering servers remotely is that it can often take a significant amount of time for an administrator to detect an alert generated by a server. For example, if a server sends alerts via email, the email messages may experience significant delay. Furthermore, an administrator may not notice that she has received an email until some time after the email was sent. Depending on the type of interface used to communicate with a particular server, an administrator may also have to expend a significant amount of effort in order to detect whether any alerts have been generated. For example, even if all of the different servers being administered are administered via a web interface, an administrator still has to install the web interface and then launch the web interface each time the administrator wants to communicate with the servers. This can also increase the time taken to notice an alert (e.g., if an administrator checks for alerts less frequently due to the amount of effort required to log in to the server). Accordingly, it is also desirable to be able to provide alerts in a manner that reduces the amount of administrator effort needed to retrieve those alerts and/or that decreases the length of time likely to elapse before an administrator becomes aware of each alert.

SUMMARY

Various embodiments of systems and methods are disclosed for administering a device via instant messaging. In one embodiment, a method involves detecting an instant message on a port associated with a device and performing an action corresponding to an administrative command, where the instant message includes information indicative of the administrative command. Another instant message can be sent in response to the device detecting a trigger condition. In some embodiments, this other instant message can include several options that each correspond to a different way in which the device can respond to the trigger condition. An administrator can select one of the options for inclusion in an a subsequent instant message in order to cause the device to perform a particular action (or no action at all) in response to the trigger condition. In another embodiment, a method involves detecting a trigger condition during operation of a device and sending an instant messaging message to an administrator, where the instant message includes information indicative of the trigger condition.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1A:
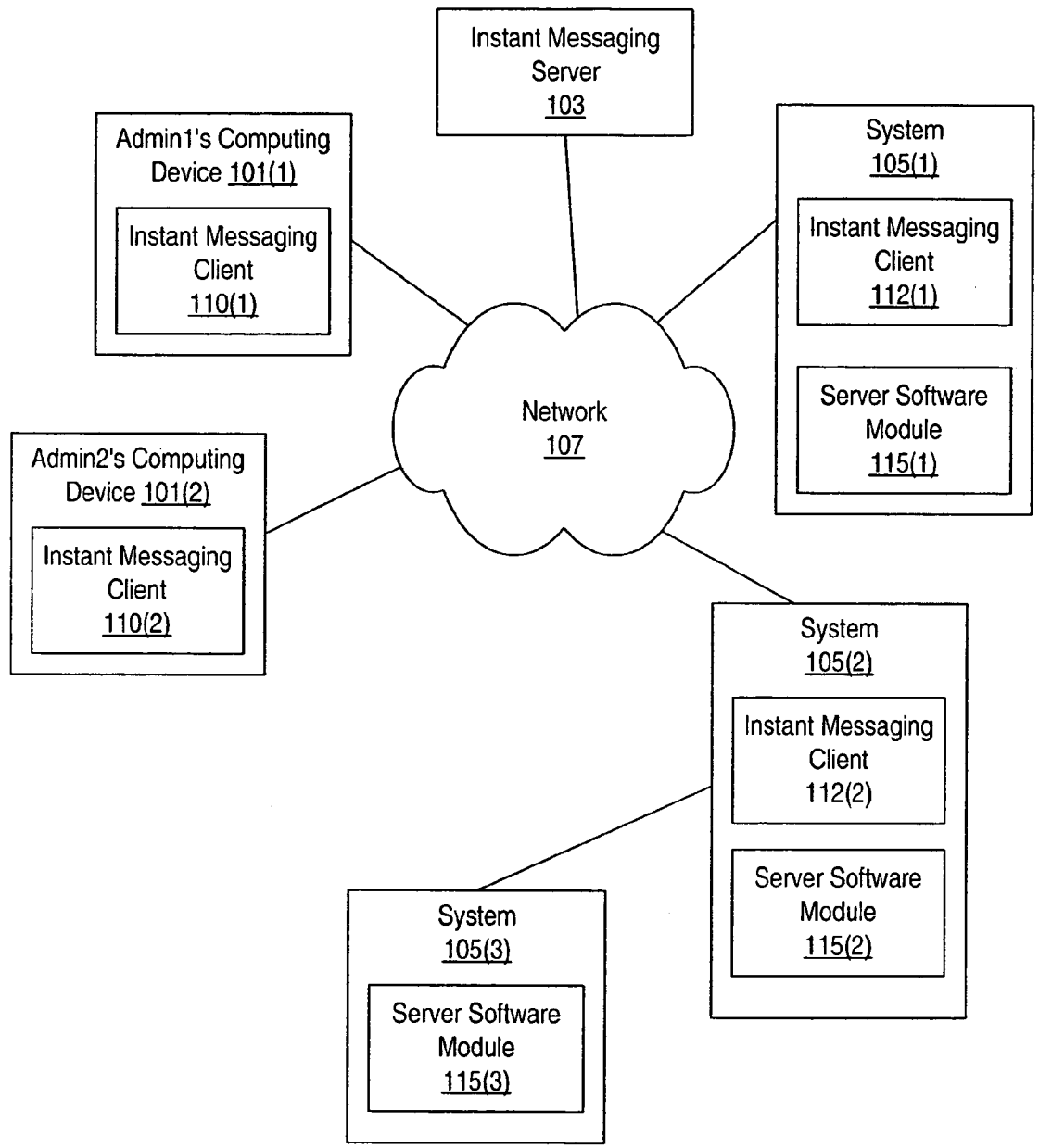
FIG. 1A is a block diagram of a system that includes several servers that are administered via instant messaging, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Instant messaging is used to administer a device. An administrator can send an instant message to a device. The instant message includes information that indicates a particular administrative command for the device. In response to receiving the instant message, the device performs an action corresponding to the administrative command indicated in the instant message. The device can perform this action automatically, without any user intervention. Devices can also send instant messages to administrators and/or to other devices or applications. As used herein, the term "device" describes a server, network device (e.g., a switch or router), appliance (e.g., power supply), and the like. The term "server" describes an application (e.g., such as server software modules 115(1)-115(3) in FIG. 1A) or computing device (e.g., such as network server computer system 120 in FIG. 1B) that operates to provide one or more services to one or more clients, typically via a network.

FIG. 1A illustrates how several computing devices 101(1)-101(2), an instant messaging server 103, and several systems 105(1)-105(3) can be coupled to communicate with each other by network 107. Network 107 can include one or more wireless networks, LANs (Local Area Networks), and/or WANs (Wide Area Networks) such as the Internet.

Computing devices 101(1)-101(2) (collectively, computing devices 101) can be any of a variety of different types of devices, including cell phones, PDAs (Personal Digital Assistants) or other handheld electronics devices; workstations, personal computers, consoles, Internet appliances, and the like; or other devices. For example, in one embodiment, computing device 101(1) is a cell phone and computing device 101(2) is a workstation. Computing device 101(1) is used by one administrator, Admin1. Computing device 101(2) is used by another administrator, Admin2. Each computing device 101(1) and 101(2) includes a respective one of instant messaging clients 110(1) and 110(2).

Instant messaging server 103 operates to inform the various instant messaging clients 110(1)-110(2) and 112(1)-112(2) about which instant messaging clients are currently online. For example, in one embodiment, each instant messaging client 110(1)-110(2) and 112(1)-112(2) opens a connection to instant messaging server 103. In some embodiments, server 103 provides password protection by having a user or server that communicates via that instant messaging client log in to instant messaging server 103 by inputting a name and password. Instant messaging server 103 verifies the name and password, and then (assuming the name and password are successfully verified) obtains connection information (e.g., an IP (Internet Protocol) address of the device or system on which the instant messaging client is running, as well as the software port ID associated with the instant messaging client) for the instant messaging client. Instant messaging server 103 can also obtain a list of contacts from the instant messaging client and determine whether any of the listed contacts are online. If any contacts are online, instant messaging server 103 provides the connection information for each of those contacts to the instant messaging client. In this way, the instant messaging client can then communicate with those contacts using the connection information, without additional assistance from instant messaging server 103.

Systems 105(1)-105(3) (collectively, systems 105) each execute at least one server software module 115(1)-115(3) (collectively, server software modules 115). Like computing devices 101, systems 105 can each include a variety of different computing systems, such as single or multi-processor computer systems. Server software modules 115 each provide a particular service or group of services to one or more clients. Example services include database services, file system services, mail services, video services, network access services, console management services, event management services, and/or Web services. Server software modules 115 can each implement a different type of server. For example, in one embodiment, server software module 115(1) implements a console management server, server software module 115(2) implements a Web server, and server software module 115(3) implements a database server. Instead of using a different client to administer each different type of server, Admin1 and Admin2 use a single instant messaging client to administer all of server software module 115.

Each system 105(1)-105(2) also includes a respective one of instant messaging clients 112(1) and 112(2). Instant messaging clients 112(1) and 112(2) (collectively, instant messaging clients 112) are each configured to send and/or receive instant messages via network 107. Instant messaging clients 112(1) and 112(2) are also configured to communicate instant messages to server software modules 115(1) and 115(2). Server software modules 115(1) and 115(2) each include an interface for communicating instant messages with a respective instant messaging client 112(1) and 112(2).

In some embodiments, each instant messaging client 112 sends and receives instant messages for several different server software modules. For example, if there are two server software modules (e.g., a file server software module and a database server software module) operating on system 105(1), instant messaging client 112(1) can send and receive instant messages for both of those server software modules. Instant messaging clients 112 can select which server software module to send a particular instant message to based on the content of that instant message. For example, instant messaging clients 112 can parse instant messages for information identifying a particular server software module and/or for information indicative of a command that is specific to a particular server software module. If an instant message includes information indicative of a file server command, for example, an instant messaging client 112 can provide that instant message to a file server software module operating on the same system as the instant messaging client. If instead the instant message includes information indicative of a database server command, the instant messaging client can provide the instant message to the database server software module that is operating on the same system as the instant messaging client.

It is noted that in some embodiments, server software modules 115 receive instant messages without the intervention of instant messaging clients 112. For example, server 115(1) can be configured to detect instant messages on a particular software port. In such embodiments, system 105(1) may not include an instant messaging client (e.g., if server software module 115(1) receives but does not send instant messages).

Each instant messaging client 110(1)-110(2) and 112(1)-112(2) operates to send and/or receive instant messages according to one or more of a variety of different instant messaging protocols, such those used by instant messaging services such as AIM (AOL (R) Instant Messenger), ICQ (R), MSN (R) (Microsoft (R) Network) Messenger, Yahoo! (R) Messenger, and Cerulean Studio's Trillian (R). An instant messaging client is a utility that allows the user to send and receive instant messages. Many instant messaging clients also alert a user as to whether one or more other users are currently online and logged in to a particular instant messaging service. As used herein, an "instant message" is a message that is sent and received, using an instant messaging protocol, in substantially real-time (e.g., with a delay between the time at which the message is sent and the time at which the message is displayed to its recipient of less than a minute). Instant messages can include text, images, voice, files, and/or other information.

Administrators such as Admin1 and Admin2 can administer server software modules 115 by sending instant messages to server software modules 115. For example, Admin1 can send an instant message, which includes information that indicates a particular administrative command, to server software module 115(1). In response to receiving the instant message, server software module 115(1) will extract the information indicative of the administrative command from the instant message. Server software module 115(1) will then perform the actions that correspond to that administrative command. In some embodiments, an administrator can send a copy of the same instant message to more than one (or even all) of server software modules 115 by addressing that instant message to a contact that represents the desired group of servers. Each administrator can use a single instant messaging client to control several different servers, even if those servers are of different types.

Administrative commands control the operation of server software modules 115 and/or cause server software modules 115 to control the operation of a device controlled by server software modules 115. There are a variety of different administrative commands, such as those used to initiate or stop automated backups, adjust load balancing within a cluster, shutdown and/or restart a server software module or system, and adjust configuration information (e.g., such as that used to implement security features or to control usage of various resources).

In some embodiments, each instant message sent from an administrator to one of server software modules 115 includes information representing text and/or icons entered by an administrator. For example, an instant message can include data that represents a text administrative command entered by an administrator. In other embodiments, each instant message includes information representing an abbreviated form (e.g., text and/or an icon) of an administrative command that is entered by an administrator to represent a particular administrative command. Server software modules 115 can be configured to recognize information that represents abbreviated forms of certain commands in instant messages. Use of the abbreviated commands may make it easier for administrators to enter those commands when using certain types of computing devices. For example, if an administrator is using a cell phone to send instant messages, the administrator may have a limited keyboard with which to enter text, making it awkward or undesirably time consuming to enter long text messages. Accordingly, using abbreviated commands can ease the administrator's task of generating instant messages that specify administrative commands from a cell phone.

In some embodiments, certain server software modules receive instant messages, extract information indicative of administrative commands from those instant messages, and then provide those administrative commands to one or more other server software modules or other applications using a communication protocol other than instant messaging. For example, as shown in FIG. 1A, server software module 115(3) does not include an instant messaging client and is not directly coupled to network 107. Server software module 115(3) is coupled to communicate with server software module 115(2), however. Server software module 115(2) can provide administrative commands that are specified in instant messages to server software module 115(3). Server software module 115(2) can selectively provide some administrative commands to server software module 115(3) based on information included in each instant message. For example, if an instant message specifically indicates that one or more of the administrative commands specified in the instant message should be performed by server software module 115(3), server software module 115(2) can forward those administrative commands to server software module 115(3). Server software module 115(2) can also select whether to provide a particular administrative command to server software module 115(3) based on other considerations.

In some embodiments, server software module 115(2) and server software module 115(3) are part of a cluster. When server software module 115(2) receives an instant message administering one or more systems that are part of the cluster, server software module 115(2) sends the administrative command indicated in the instant message to each system 105 (or to each server or other application) that participates in that cluster. Server software module 115(2) can send the administrative command using a protocol for communicating within the cluster. In some embodiments, such a protocol ensures that each of the systems and/or servers or other applications executing on each system receives the administrative command at substantially the same time. In alternative embodiments, each system running an application as part of the cluster can include an instant messaging client, and server software module 115(2) can send an instant message that includes information representing the administrative command to each other system 105 or application included in the cluster.

Server software modules 115 can also send instant messages to inform administrators about errors or potential problems encountered by server software modules 115. For example, server software module 115(2) can send an instant message to one or both of Admin1 and Admin2 indicating that an error has been encountered. Server software module 115(2) can also include a list of possible actions that server software module 115(2) can take (and/or corresponding administrative commands) in response to the error. Admin1 or Admin2 can respond to the instant message sent by server software module 115(2) by sending an instant message that selects one of those actions. In response to that instant message, server software module 115(2) can perform the specified action.

While the embodiment of FIG. 1A shows a system that includes a dedicated instant messaging server 103, other embodiments do not include a dedicated instant messaging server. For example, in some embodiments, each computing device 101 is assigned a static IP address. Each instant messaging client 112 (or each server 115, in embodiments that do not include separate instant messaging clients 112) can be programmed with the IP address of each computing device 101 and can use these IP addresses to send instant messages to Admin1 and Admin2.

Figure 1B:
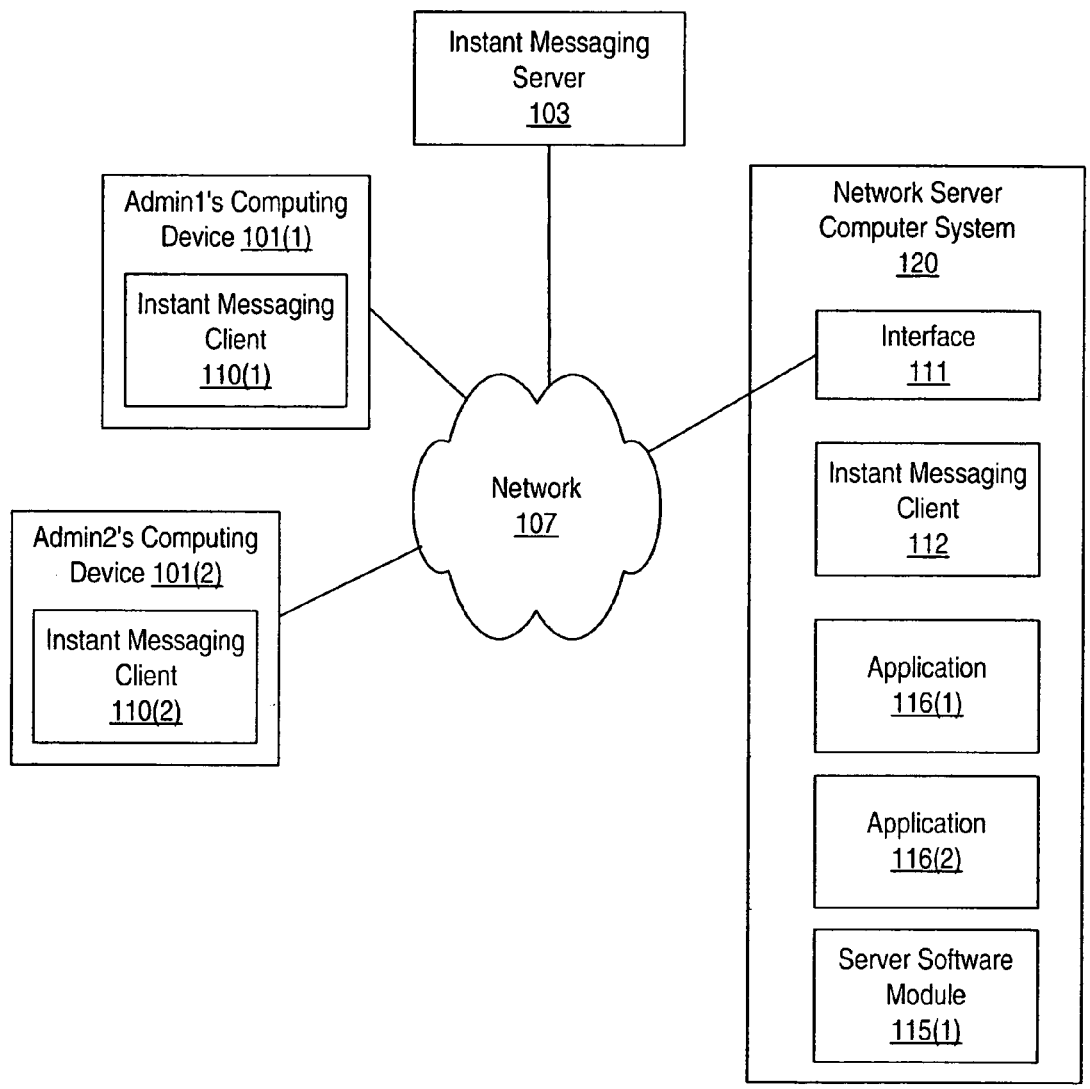
FIG. 1B is a block diagram of another system that includes a server that is administered via instant messaging, according to one embodiment of the present invention.

Similarly, while the embodiment of FIG. 1A shows a system in which several server software modules are administered via instant messaging, it is noted that servers implemented in hardware (e.g., network server computer systems) can also be administered via instant messaging. FIG. 1B shows a system in which several applications 116(1)-116(2) (collectively applications 116) and a server software module 115(1) are executing on network server computer system 120. Administering network server computer system 120 can involve controlling the operation of network server computer system 120 and/or controlling the operation of applications 116 (which may themselves control network server computer system 120) and server software module 115(1) executing on network server computer system 120. Server software module 115(1) is an example of a server application, and applications 116 can also be server applications. Applications 116 can alternatively be non-server applications. For example, each application 116 can be an operating system, file system, and/or database application that, when executing, controls the behavior of network server computer system 120.

Network server computer system 120 includes an interface 111, such as a network interface card, via which network server computer system 120 can send and receive instant messages on network 107. Network server computer system 120 can also include an instant messaging client 112 that detects instant messages received via interface 111 and provides those instant messages to applications 116 and to server software module 115(1).

When network server computer system 120 receives an instant message via interface 111, network server computer system 120 can itself perform an action that corresponds a particular administrative command contained in the instant message. For example, network server computer system 120 can reboot in response to receiving an instant message that indicates a reboot command.

Alternatively, each instant message can be provided to a specific one (or to a specific group) of applications 116. For example, instant messaging client 112 can parse the instant message to detect any application-specific information (such as commands or application-identifying information) in order to determine which application to provide the instant message to. If the instant message includes a command that is specific to application 116(2), for example, instant messaging client 112 can provide the instant message to application 116(2). Similarly, if the instant message includes information that specifies a particular application (e.g., if Admin2 had originally entered text stating "Restart Application 116(1)"), instant messaging client 112 can provide that instant message to the specified application (e.g., application 116(1)). In some embodiments in which instant messages are provided to specific applications, instant messages received via interface 111 are not provided directly to network server computer system 120 (e.g., an instant message specifying a reboot command for network server computer system 120 would be provided to an operating system application that controls network server computer system 120 instead of being directly provided to power control hardware in server 120).

In some embodiments, an administrator can send an instant message to network server computer system 120 from network server computer system 120 itself. For example, a display device (e.g., a monitor) and an input device (e.g., a mouse, keyboard, or the like) can be connected to network server computer system 120 in order to allow an administrator to interact with network server computer system 120. In such an embodiment, the administrator can install an instant messaging client (e.g., similar to instant messaging clients 110 (1)-110(2)) on network server computer system 120. The administrator can enter an instant message into this instant messaging client and send it to a contact that represents network server computer system 120. Instant messaging client 112 on network server computer system 120 can receive the instant message and provide it to one or more of applications 116 and/or to server software module 115(1). In situations like, these, instant messages that administer a server may not be transmitted across a network 107 (e.g., if the sending instant messaging client resides on the same machine as the receiving instant message client or interface).

FIG. 1A and FIG. 1B provide examples of how instant messaging can be used to administer a server. Similar techniques can be used to administer other types of devices. For example, a network device such as a router can include an interface or instant messaging client that receives instant messages addressed to the network device. The network device can extract information indicative of an administrative command from such instant messages and can perform an action corresponding to the indicated administrative command.

Figure 2:
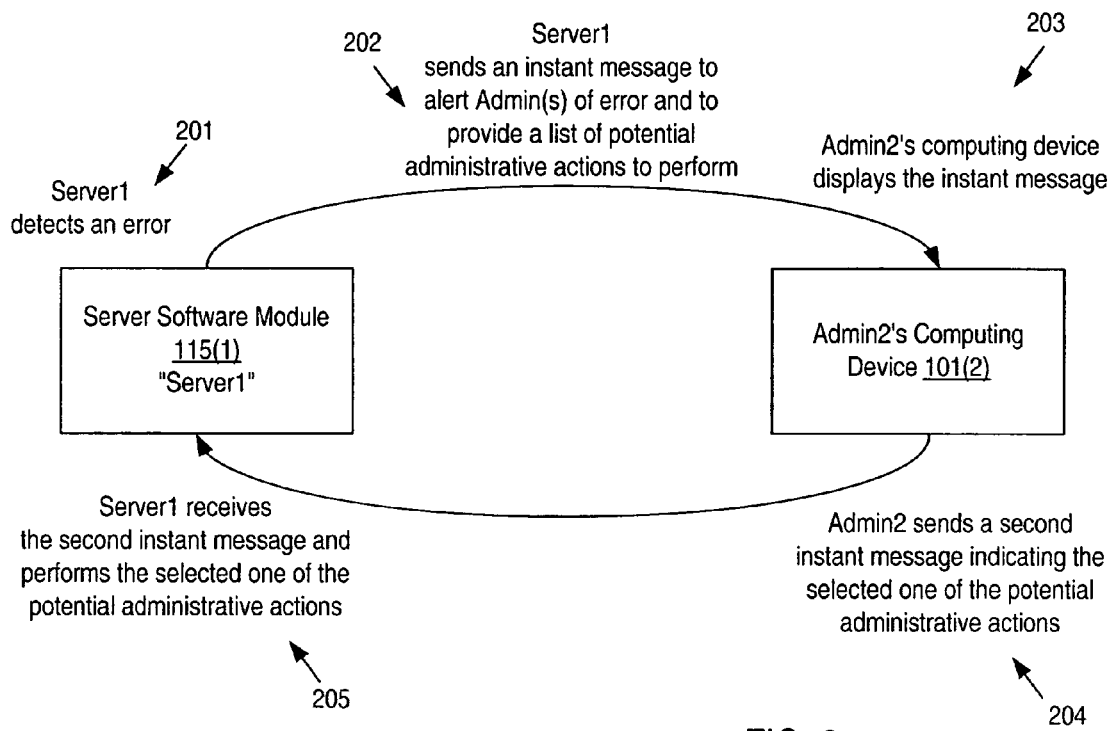
FIG. 2 illustrates how a server can use instant messaging to communicate with an administrator, according to one embodiment of the present invention.

FIG. 2 illustrates how a server can use instant messaging to communicate with an administrator. As shown, server software module 115(1), "Server1", communicates instant messages with Admin2's computing device, computing device 101(2). At 201, Server1 detects an error. Server1 sends an instant message to one or more administrators, including Admin2, to alert them to the error, as shown at 202. Server1's instant message also includes a list of potential administrative actions to perform. In some embodiments, Server1 selects which administrators to send an instant message to based on presence information maintained by an instant messaging client on the same system (e.g., system 105(1)) as Server1. For example, Server1 sends an instant message to Admin2 but not to Admin1 if the presence information indicates that Admin1 is offline and Admin2 is online.

At 203, Admin2's computing device (computing device 101(2)) receives and displays the instant message. Admin2 provides computing device 101(2) with user input that creates a second instant message, which indicates a selected one of the potential administrative actions, and sends that instant message to Server1, as shown at 204. At 205, Server1 receives the second instant message and performs the selected one of the administrative actions. It is noted that Server1 performs the selected administrative action indicated in the instant message automatically upon receiving the instant message, without intermediate user intervention (i.e., Server1 does not need to display the contents of the instant message from Admin2 to a user, nor does Server1 need to have the user can select or otherwise interact with the contents of the message, in order for Server1 to be able to perform the selected administrative action indicated in the instant message).

Figure 3A:
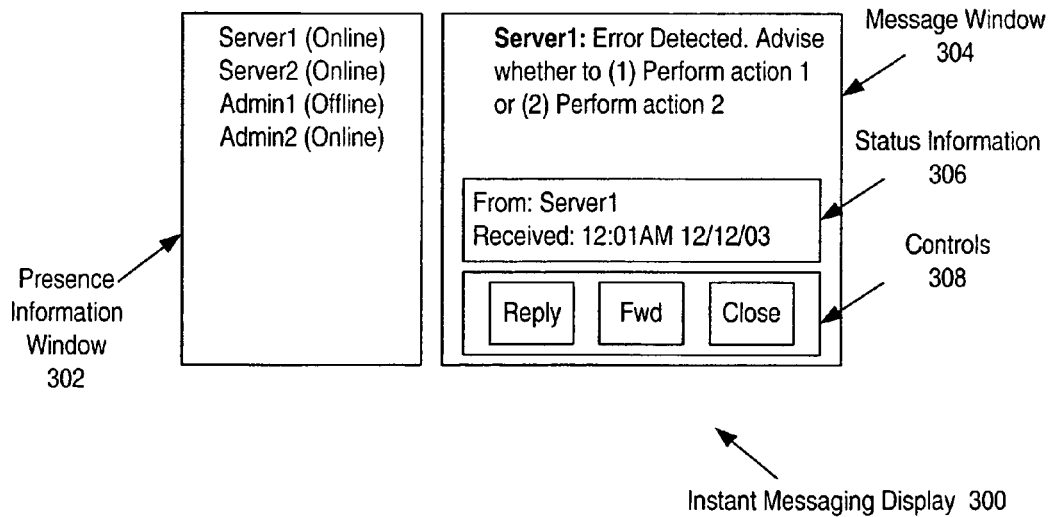
FIGS. 3A-3B show snapshots of an exemplary user display that can be displayed by an administrator's computing device during an instant messaging exchange with a server, according to one embodiment of the present invention.
Figure 3B:
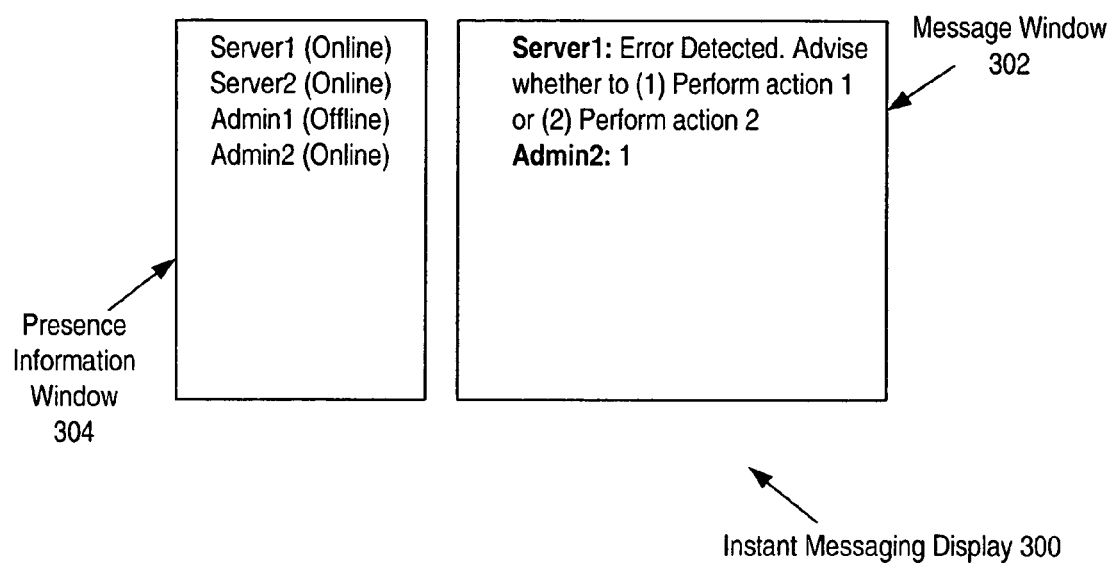

FIGS. 3A-3B show snapshots of an exemplary user display that can be displayed by Admin2's computing device (computing device 101(2)) at two different points during the instant message exchange shown in FIG. 2. As shown in FIG. 3A, instant messaging display 300 includes presence information window 302 and message window 304.

Presence information window 302 displays a list of users as well as information indicating whether those users are currently online (e.g., a user can be considered online if that user has logged in to an instant messaging server, as described above). This list of users is part of a contact list (also referred to as a buddy list) maintained by Admin2. As shown, individual servers and administrators can each be assigned a name for use with the instant messaging protocol.

Whenever the instant messaging client (e.g., instant messaging client 110(2) in FIG. 1A and FIG. 1B) executing on Admin2's computing device logs into the instant messaging server (e.g., instant messaging server 103, as shown in FIG. 1A and FIG. 1B), the instant messaging client can provide Admin2's contact list to the instant messaging server. The instant messaging server can send messages, indicating whether a given contact is currently online or not, to the instant messaging client. As users log on and off from the instant messaging service, the instant messaging server can send messages to the instant messaging client updating the status of that instant messaging client's contacts. The instant messaging client displays the current status of each contact to Admin2 in presence information window 302 based on this information. In this example, Server1 and Server2 are both currently online. Admin1 is currently offline, and Admin2 is currently online. It is noted that alternative embodiments do not use presence information (e.g., instant messages are sent to users without regard to and/or knowledge of whether those users are currently online), and that such embodiments do not implement presence information window 302.

Message window 304 displays one or more instant messages, status information 306, and controls 308 in this embodiment. In FIG. 3A, message window 304 displays a single instant message from Server1. This message is a text message that states: "Error detected. Advise whether to (1) Perform action 1 or (2) Perform action 2." This message is an example of a message that can be sent from server 115(1) to Admin2's computing device, computing device 101(2), in FIG. 2.

Status information 306 displays information about one or more of the instant messages displayed in message window 304. In this example, status information 306 identifies the sender, Server1, of the instant message, as well as the time at which the instant message was received. Other embodiments can display additional information instead of or in addition to the information shown in FIG. 3A. Alternatively, some embodiments may not display status information 306.

Controls 308 include controls corresponding to several actions Admin2 can take, including replying to the instant message ("Reply"), forwarding the instant message ("Fwd"), and closing message window 304 ("Close"). Admin2 can control a user input device (e.g., a mouse or keyboard) in order to select one of controls 308. Other embodiments include different controls in addition to and/or instead of those shown in FIG. 3A.

FIG. 3B illustrates an example of what can be displayed in message window 304 after Admin2 sends an instant message to Server1. In this example, Admin2 has replied with a text instant message that states: "1". This instant message indicates that Admin2 has selected action 1 to be performed by Server1. In response to receiving this message, Server1 extracts the content of the message (here, the text "1"). This content indicates a particular administrative command. In response to receiving the instant message, Server1 performs the administrative action, action 1, that corresponds to the indicated administrative command.

Figure 4:
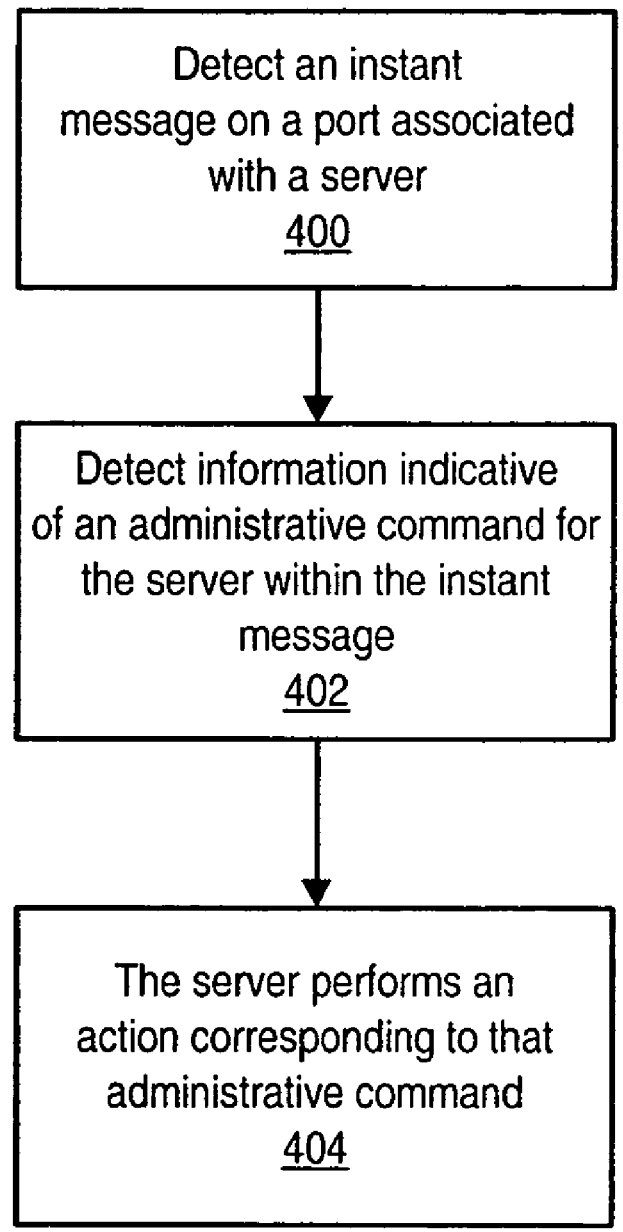
FIG. 4 is a flowchart showing how a server can be administered via instant messaging, according to one embodiment of the present invention.

FIG. 4 is a flowchart showing how a server can be administered via instant messaging. It is noted that a similar method can be used to administer other types of devices. At 400, an instant message is detected on a port associated with a server. This port can be a software port (e.g., identifying a particular server software module executing on a computer system) or a hardware port (e.g., a network interface card in a network server computer system). Similarly, the server can be implemented in hardware (e.g., the server can be a network server computer system) or software (e.g., the server can be a server software module). Detecting the instant message can involve receiving the message via a network interface card (e.g., in response to the instant message being addressed to an IP address associated with that network interface card) and/or detecting that the instant message is addressed to a particular software port. The instant message can be sent by an administrator who is remotely administering the server.

At 402, information indicative of an administrative command for the server is detected within the instant message. This information can explicitly identify an administrative command in some embodiments. In other embodiments, the information represents a particular administrative command. For example, the information can be text specifying an abbreviated form of the administrative command or an icon representing the administrative command. The server can parse or otherwise search the instant message to detect this information.

The server performs an action corresponding to the administrative command, at shown at 404. For example, the action can involve updating configuration information for the server (or for a device controlled by the server) if the administrative command requests such an update. Similarly, the action can involve rebooting a computer system. For example, if the server is a network server computer system, the instant message can be provided to an operating system executing on the network server computer system and the operating system can reboot the network server computer system. If the server is a server software module, one possible action can involve stopping or restarting the server software module, based on the content of the instant message. Other actions can include initiating an automated backup process. Some actions include generating another instant message to an administrator and/or to one or more other servers. For example, the server can generate an instant message confirming that one or more other tasks were performed. Similarly, if the administrative command indicated in the instant message requests that the server provide the administrator with details regarding current usage of a particular resource, the server can perform the action by: determining the current usage of that resource, including information specifying that usage in an instant message, and sending that instant message to the administrator.

It is noted that in some embodiments, the action performed at 404 can involve simply logging that an instant message was received and/or updating other state information based on the contents of the instant message. For example, an administrator can send an instant message in order to inform the server of a particular condition, and this instant message may not require any additional action to be performed. Additionally, if an instant message is received that does not include information indicative of a valid administrative command, no action may be taken. Alternatively, if a received instant message does not include a valid administrative command, an error can be logged.

Figure 5:
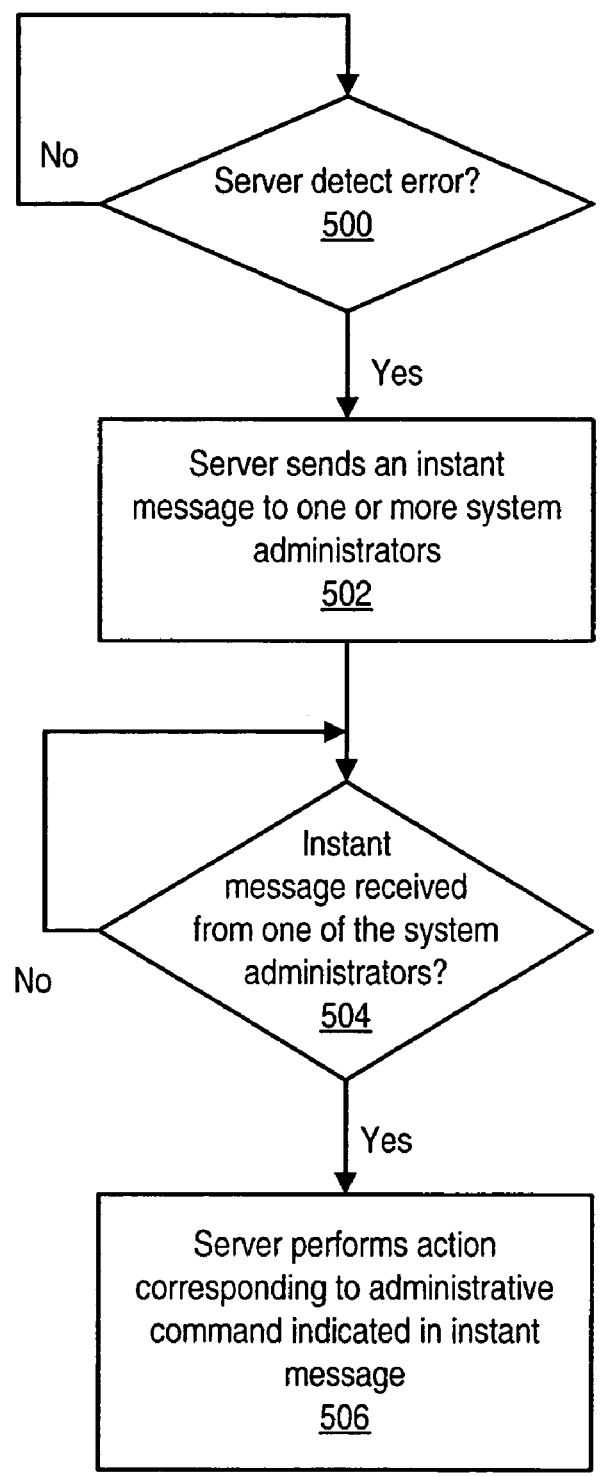
FIG. 5 illustrates how a server can send an instant message to alert an administrator to an error or other trigger condition, according to one embodiment of the present invention.

FIG. 5 illustrates how a server can send an instant message to alert an administrator to an error or other trigger condition. Similar techniques can be used by other types of devices when sending instant messages to alert an administrator to a particular occurrence. As shown at 500, the server can monitor for errors. It is noted that a server can also monitor for other trigger conditions (e.g., completion of a certain process). In some embodiments, such a trigger condition can be any condition or occurrence that would typically cause the server to generate a log entry or email. For example, a trigger condition can occur when a user's disk quota is exceeded. In another embodiment, a trigger condition occurs when a server, which monitors the status of another server, detects that the other server has gone offline. Since it is often easier and/or quicker for an administrator to notice and/or retrieve instant messages, less administrator action may be needed for the administrator to detect such alerts via instant message than would be needed if the alerts were simply logged or transmitted via email.

If an error or other trigger condition is detected, the server sends an instant message to one or more administrators, as indicated at 502. The message identifies that an error or other trigger condition has been detected. In some embodiments, the message identifies the particular error or trigger condition (e.g., as opposed to simply indicating that an error has occurred). For example, the server can maintain a table of potential trigger conditions and associated pre-defined instant messages. If one of the trigger conditions occurs, the server can send the associated pre-defined instant message. As noted above, the instant message can also identify one or more administrative commands that can be performed in response to the error or other trigger condition.

In some embodiments, the server selects which administrators to send the instant message to based on which administrators are currently identified as being online by the instant messaging service. If more than one administrator is currently online, the server can either send the instant message to all of the online administrators or select one administrator to which to send the message. If the instant message is to be sent to multiple recipients, the server can repeatedly send the same instant message until the instant message has been sent to each of the recipients.

Alternatively, if the instant messaging service allows a single name (e.g., in a contact list, a name such as "Admin-Group" can be associated with multiple individuals) to be associated with multiple recipients, the server can send the instant message, addressed to that name, a single time. The instant messaging service can then provide a copy of the instant message to each of the individuals associated with that name. The instant messaging service can send the instant message to each of the individuals (without regard to whether those individuals are currently online), selectively send the instant message to each of the individuals that is currently online, or send the instant message to some combination thereof. While such a feature is provided by the instant messaging service in some embodiments, other embodiments implement the feature in the server itself. For example, the server can include an interface to the instant messaging service. This interface can associate a single name, e.g. "Admin-Group", with several individual contact names, e.g., Admin1 and Admin2. Whenever an instant message addressed to AdminGroup is being sent by the server, the interface can provide two copies of the instant message, one addressed to Admin1 and one addressed to Admin2, to the instant messaging client.

At 504, the server waits to receive an instant message from one of the system administrators. If an instant message is received, the server extracts information indicative of an administrative command from the instant message and performs one or more actions that correspond to that administrative command, as shown at 506. In some embodiments, the administrative command indicated in the instant message received at 506 is selected from one of several choices identified in the instant message sent at 502.

Figure 6:
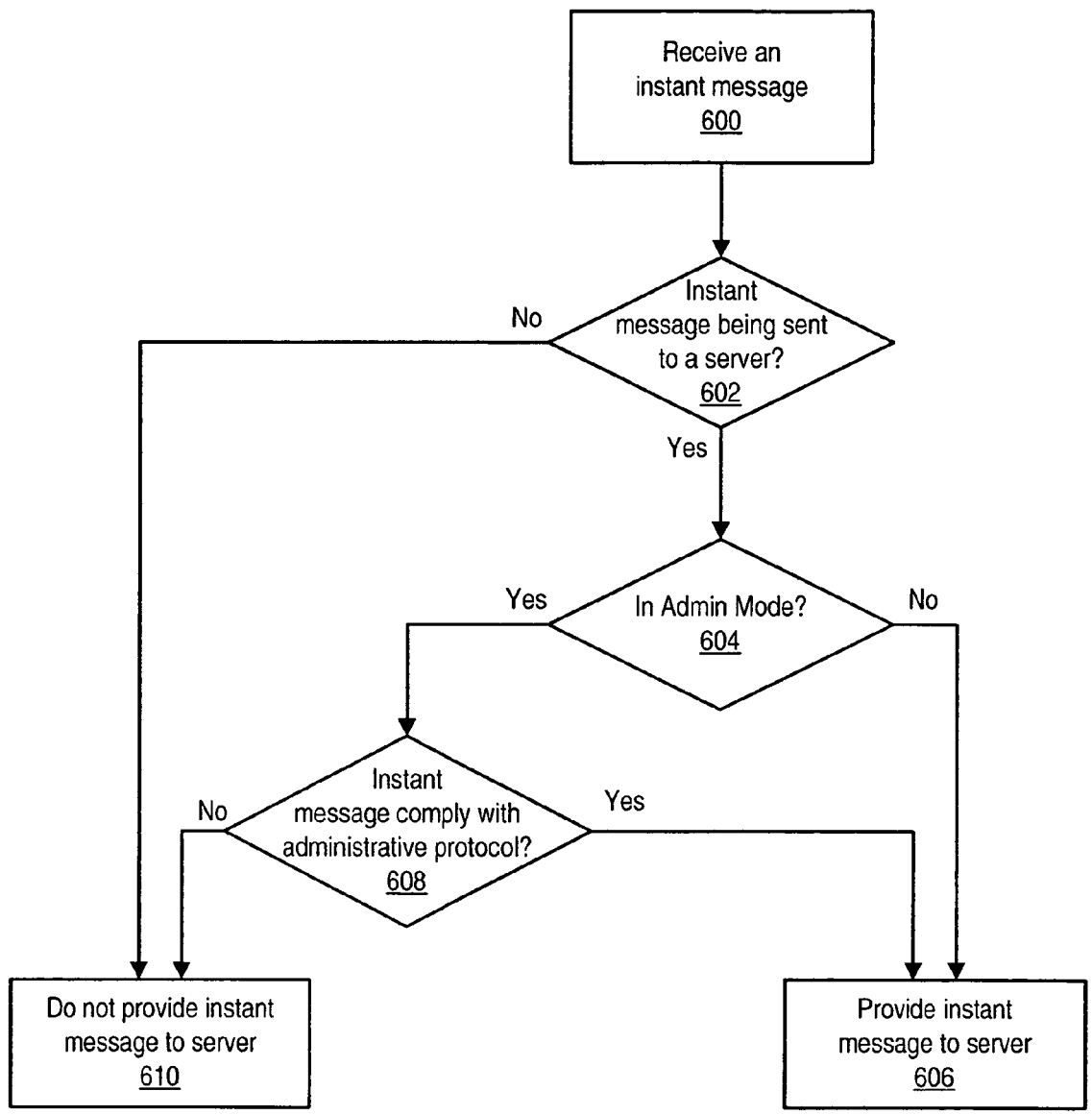
FIG. 6 shows how instant messages sent between a server and an administrator can comply with an "administrative mode", according to one embodiment of the present invention.

FIG. 6 shows how, in some embodiments, instant messages sent between a server (or other type of device) and an administrator are forced to comply with an "administrative mode". For example, an interface in a server or an instant messaging client (e.g., instant messaging clients 112 in FIG. 1A and FIG. 1B) that communicates instant messages with a server can have an administrative mode. When in the administrative mode, the interface or instant messaging client ensures that all messages comply with a particular protocol. For example, the protocol can include a specific list of text administrative commands, and the protocol can filter out instant messages that include text that is not one of the administrative commands and/or instant messages that do not include any information indicative of a valid administrative command.

At 600, an instant message is received. As indicated at 602, it is determined whether the instant message is being sent to a particular server in which the interface is included or with which the instant messaging client communicates. For example, an interface can perform function 602 by filtering out messages that are not directed to the server in which that interface is included. If an instant messaging client communicates with several different servers, function 602 can involve determining which server (or servers), if any, to provide the instant message to. For example, the instant message can be examined for server-specific information in order to determine which server to provide the instant message to. Server-specific information can include information that explicitly identifies a particular server or group of servers or information that indicates a particular administrative command that is specific to a particular server or group of servers. If an instant message is not being sent to a' server (e.g., if an interface determines that the instant message is not being sent to the server that includes the interface), the message is not provided to a server, as indicated at 610. It is noted that some embodiments do not implement function 602.

In some embodiments, in addition to determining which server to provide the instant message to, it can also be determined which service or services within a particular server the instant message should be provided to. For example, if the server is a network server computer system, several applications that each provide a different service can be executing on the network server computer system. In one embodiment, an operating system, file system, and database can be executing on the network server computer system. If an instant message is received by the network server computer system, an interface and/or instant messaging client on the network server computer system can determine which particular application (the operating system, the file system, or the database) or group of applications should receive the instant message. The interface and/or instant messaging client can determine this by examining the instant message for application-specific information, such as application-specific commands. For example, an instant messaging client executing on the network server computer system can determine that an instant message that includes a file system command should be provided to the file system executing on the network server computer system. Similarly, if the instant message includes information indicating that all applications currently involved in a particular activity (e.g., using the network interface card) should be restarted, the instant messaging client can provide a copy of the instant message to each application that is currently involved in that activity.

If the instant message is for a server, it is determined whether the interface or instant messaging client is in administrative mode, as shown at 604. If the interface or instant messaging client is not in administrative mode ("Admin Mode"), the instant message is provided to the server, as shown at 606, without regard to the content or format of the instant message.

If the interface or instant messaging client is in administrative mode, the instant messaging client determines whether the instant message complies with the administrative ("admin") protocol, as shown at 608. For example, an instant messaging client can parse the instant message to determine whether the instant message has a particular format required by the administrative protocol. Similarly, the spelling of words included in the instant message can be verified. The interface or instant messaging client can also verify that any administrative commands included in the instant message are specified appropriately (e.g., using a pre-defined abbreviation). If the instant message complies with the administrative protocol, the instant message is provided to the appropriate server, as indicated at 606. Otherwise, the instant message is not provided to a server, as shown at 610. In the latter situation, an error indication or other notification can be sent to the sender of the instant message, indicating that the instant message will not be provided to the server because the instant message does not comply with the administrative protocol.

Figure 7:
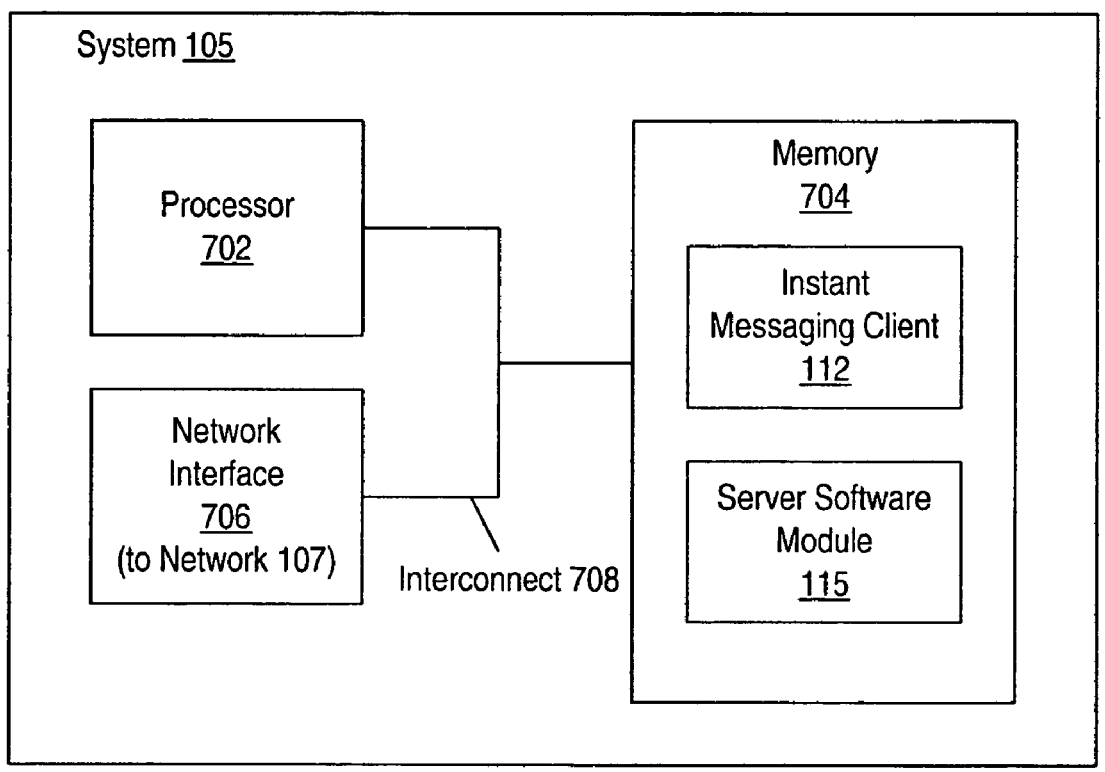
FIG. 7 illustrates how an instant messaging client and a server can be implemented in software in some embodiments.

FIG. 7 illustrates how instant messaging client 112 and server software module 115 can be implemented in software in some embodiments. Here, system 105 (e.g., one of systems 105(1)-105(3)) includes one or more processors 702, memory 704, and a network interface 706, which are coupled by interconnect 708. Processor 702 can be a microprocessor, PLD (Programmable Logic Device), ASIC (Application Specific Integrated Circuit), or other device configured to execute program instructions stored in memory 704. Memory 704 can include various types of RAM (Random Access Memory), ROM (Read Only Memory), Flash memory, MEMS (Micro Electro-Mechanical Systems) memory, and the like. Network interface 706 allows various programs executing on system 105 to send and receive information via a network (e.g., network 107 in FIG. 1A and FIG. 1B). Interconnect 708 can include one or more buses or other interconnects (e.g., point-to-point interconnects).

It is noted that in alternative embodiments, instant messaging client 112 and/or server software module 115 are implemented in hardware or in a combination of hardware and software instead of being implemented in software. For example, server software module 115 can be implemented in an ASIC configured to perform the same functions as the program instructions shown in FIG. 7.

The program instructions and data implementing instant messaging client 112 and/or server software module 115 can be stored on various computer readable media such as memory 704. In some embodiments, such software is stored on a computer readable medium such as a CD (Compact Disc), DVD (Digital Versatile Disc), hard disk, optical disk, tape device, floppy disk, and the like). In order be executed by processor 702, the instructions and data implementing instant messaging client 112 and/or server software module 115 are loaded into memory 704 from the other computer readable medium. The instructions and/or data can also be transferred to system 105 for storage in memory 704 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing instant messaging client 112 and/or server software module 115 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
sending an instant messaging message, from a device, in response to the device detecting a trigger condition, wherein
the instant messaging message includes a plurality of options;
selecting an administrator from a plurality of administrators, based upon presence information maintained by an instant messaging client, wherein the instant messaging message is sent to the selected administrator;
detecting a second instant messaging message from the administrator on a port associated with the device;
performing an action corresponding to an administrative command, wherein
the second instant messaging message comprises information indicative of the administrative command;
in response to the detecting the second instant messaging message, sending a message, from the device, to each of a plurality of devices, wherein
the message indicates the administrative command,
a cluster comprises the plurality of devices, and
the message is sent according to a cluster communication protocol.

2. The method of claim 1, wherein
the second instant messaging message is received subsequent to the sending the instant messaging message, and
the information comprised in the second instant messaging message indicates one of the plurality of options.

3. The method of claim 1, further comprising:
providing the second instant messaging message to at least one of a plurality of applications executing on the device if the second instant messaging message includes information specific to the at least one of the plurality of applications.

4. A system comprising:
a processor; and
a memory coupled to the processor and storing program instructions executable by the processor to:
send an instant messaging message, from a device, in response to the device detecting a trigger condition, wherein
the instant messaging message includes a plurality of options;
select an administrator from a plurality of administrators, based upon presence information maintained by an instant messaging client, wherein the instant messaging message is sent to the selected administrator;
detect a second instant messaging message from the administrator on a port associated with the device;
perform an action corresponding to an administrative command, wherein
the second instant messaging message comprises information indicative of the administrative command; and
send a message from the device to each of a plurality of devices, in response to the detecting the second instant messaging message, wherein
the message indicates the administrative command,
a cluster comprises the plurality of devices, and
the message is sent according to a cluster communication protocol.

5. A computer readable storage medium comprising program instructions executable to:
send an instant messaging message, from a device, in response to the device detecting a trigger condition, wherein
the instant messaging message includes a plurality of options;
select an administrator from a plurality of administrators, based upon presence information maintained by an instant messaging client, wherein the instant messaging message is sent to the selected administrator;
detect a second instant messaging message from the administrator on a port associated with the device;
perform an action corresponding to an administrative command, wherein
the second instant messaging message comprises information indicative of the administrative command; and
send a message from the device to each of a plurality of devices, in response to the detecting the second instant messaging message, wherein
the message indicates the administrative command,
a cluster comprises the plurality of devices, and
the message is sent according to a cluster communication protocol.

6. A system comprising:

means for sending an instant messaging message, from a device, in response to the device detecting a trigger condition, wherein
   the instant messaging message includes a plurality of options;
means for selecting an administrator from a plurality of administrators, based upon presence information maintained by an instant messaging client, wherein the instant messaging message is sent to the selected administrator;
means for detecting a second instant messaging message from the administrator on a port associated with the device;
means for performing an action corresponding to an administrative command, wherein the second instant messaging message comprises information indicative of the administrative command;
and
means for sending a message, from the device, to each of a plurality of devices, in response to the detecting the second instant messaging message, wherein
   the message indicates the administrative command,
   a cluster comprises the plurality of devices, and
   the message is sent according to a cluster communication protocol.

* * * * *